United States Patent
Park et al.

(10) Patent No.: US 8,462,726 B2
(45) Date of Patent: Jun. 11, 2013

(54) METHOD FOR PERFORMING RANGING PROCEDURE

(75) Inventors: Kyu Jin Park, Anyang-si (KR); Minseok Oh, Anyang-si (KR); Hyung Ho Park, Anyang-si (KR); Doo Hyun Seong, Anyang-si (KR); Eun Jong Lee, Anyang-si (KR); Jin Soo Choi, Anyang-si (KR); Jae Hoon Chung, Anyang-si (KR); Seong Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 12/513,608

(22) PCT Filed: Jul. 4, 2008

(86) PCT No.: PCT/KR2008/003951
§ 371 (c)(1),
(2), (4) Date: Feb. 11, 2010

(87) PCT Pub. No.: WO2009/008633
PCT Pub. Date: Jan. 15, 2009

(65) Prior Publication Data
US 2010/0157933 A1 Jun. 24, 2010

(30) Foreign Application Priority Data

Jul. 6, 2007 (KR) .................. 10-2007-0067879

(51) Int. Cl.
*H04W 4/00* (2009.01)

(52) U.S. Cl.
USPC ............................................ 370/330; 370/208

(58) Field of Classification Search
None
See application file for complete search history.

(56) References Cited

U.S. PATENT DOCUMENTS

| 5,940,765 | A | 8/1999 | Haartsen |
| 2003/0112878 | A1* | 6/2003 | Kloper ................... 375/259 |
| 2004/0146019 | A1 | 7/2004 | Kim et al. |
| 2005/0058058 | A1* | 3/2005 | Cho et al. .............. 370/208 |
| 2008/0233958 | A1* | 9/2008 | Robbins et al. ........ 455/436 |
| 2009/0097449 | A1* | 4/2009 | Jin ........................ 370/331 |
| 2009/0322491 | A1* | 12/2009 | Wood, Jr. ............. 340/10.4 |

FOREIGN PATENT DOCUMENTS

| EP | 1 324 509 A2 | 7/2003 |
| JP | 6-335045 A | 12/1994 |
| KR | 10-2006-0000274 | * 1/2006 |

* cited by examiner

*Primary Examiner* — Chi Pham
*Assistant Examiner* — Mohammad Adhami
(74) *Attorney, Agent, or Firm* — Birch, Stewart, Kolasch & Birch, LLP

(57) ABSTRACT

A method for performing a ranging procedure includes transmitting a ranging request message through a randomly selected ranging slot to a base station, the ranging request message comprising a randomly selected ranging code, and receiving a ranging response message including collision information which informs that collision occurs when at least two user equipments transmit the same ranging code to the base station through the same ranging slot. Delay in the ranging can be reduced.

12 Claims, 7 Drawing Sheets

METHOD FOR PERFORMING RANGING PROCEDURE

TECHNICAL FIELD

The present invention relates to wireless communications, and more particularly, to a method for effectively performing a ranging procedure when collision occurs between user equipments.

BACKGROUND ART

In next generation multimedia mobile communication systems, which have been actively studied in recent years, there is a demand for a system capable of processing and transmitting a variety of information (e.g., video and radio data) in addition to the early voice-oriented services.

In the communication systems, a receiver and a transmitter need to be synchronized with each other for data reception and demodulation. In particular, in order for the communication systems to successfully receive data in a continuously changing channel environment, synchronization is adjusted through closely-related signaling between a base station (BS) and a user equipment (UE).

A communication channel between the BS and the UE includes a downlink channel directed from the BS to the UE and an uplink channel directed from the UE to the BS.

In downlink, a plurality of UEs is downlink synchronized according to a data frame transmitted from the BS in a point-to-multipoint environment. According to a method for allowing the UEs to attain synchronization, the BS can insert a preamble for synchronization into a portion of the transmitted frame. The UEs adjust synchronization for a downlink channel by using the preamble. The BS can use a separate synchronization channel.

In uplink, each UE has to transmit data to the BS through time and/or frequency domains assigned to each UE so that the BS can receive data without interference between the UEs. Therefore, for uplink synchronization, there is a need to regulate synchronization through signaling between the BS and the UE by considering a channel environment of each UE. A signal exchanged between the UE and the BE to adjust uplink synchronization is referred to as a ranging signal. A series of processes for controlling transmit (Tx) power by exchanging the ranging signal between the UE and the BS and for adjusting time/frequency synchronization is referred to as a ranging procedure. It can be said that the ranging procedure is a series of processes for attaining uplink synchronization.

Initial ranging is a process for obtaining an exact timing offset between the UE and the BS and for regulating Tx power in an initial stage. When power is turned on, the UE attains downlink synchronization from a received downlink preamble signal. Subsequently, the UE performs the initial ranging to obtain an uplink timing offset and to regulate the Tx power. Unlike the initial ranging, periodic ranging is a process for periodically tracking the uplink timing offset and received signal strength after the initial ranging.

If the ranging procedure is delayed, uplink transmission of the UE is also delayed. In addition, since data is not actually transmitted in the ranging procedure, repetition of the ranging procedure may lead to waste of battery capacity of the UE irrespective of data transmission.

Accordingly, there is a need for a method for rapidly attaining uplink synchronization while minimizing battery consumption of the UE.

DISCLOSURE OF INVENTION

Technical Problem

The present invention provides a method in which a base station informs a user equipment that collision occurs between UEs during a ranging procedure.

Technical Solution

In an aspect, a method for performing a ranging procedure for attaining uplink synchronization is provided. The method includes transmitting a ranging request message through a randomly selected ranging slot to a base station, the ranging request message comprising a randomly selected ranging code, and receiving a ranging response message including collision information which informs that collision occurs when at least two user equipments transmit the same ranging code to the base station through the same ranging slot.

In another aspect, a method for performing a ranging procedure in which a base station regulates a time or frequency offset required for uplink transmission is provided. The method includes receiving a ranging request message by which a ranging code randomly selected by each user equipment is transmitted through a randomly selected ranging slot, and transmitting a ranging response message including collision information which informs that collision occurs when the plurality of user equipments transmits the ranging request message including the same ranging code through the same ranging slot.

Advantageous Effects

When collision occurs between user equipments during a ranging procedure such as network initialization, handover, radio resource allocation request, etc., a base station informs the user equipments of the occurrence of collision so that the user equipments can promptly perform retransmission. Therefore, the ranging procedure can be prevented from being delayed due to collision.

MODE FOR THE INVENTION

Figure 1:
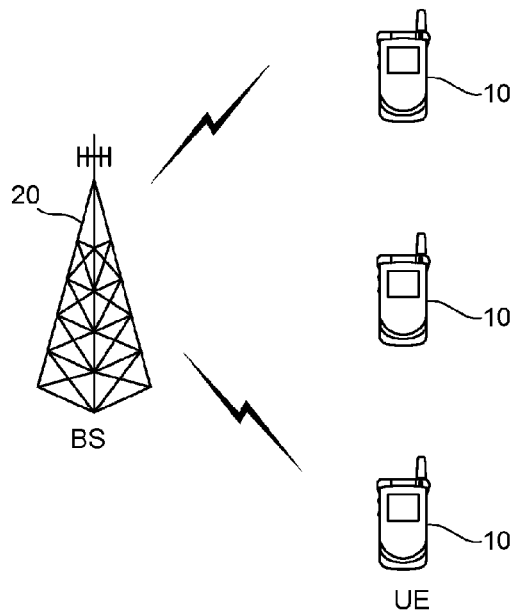
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers.

A slot is a minimum unit of possible data allocation, and is defined by a time and a subchannel. The subchannel may include a plurality of tiles in uplink transmission. The subchannel may include 6 tiles. In uplink transmission, one burst may include 3 OFDM symbols and one subchannel. In a partial usage of subchannel (PUSC) permutation, each tile may include 4 contiguous subcarriers on 3 OFDM symbols. Optionally, each tile may include 3 contiguous subcarriers on 3 OFDM symbols. A bin includes 9 contiguous subcarriers on an OFDM symbol. A band is a group of 4 rows of the bin. An adaptive modulation and coding (AMC) subchannel includes 6 contiguous bins in the same band.

Figure 2:
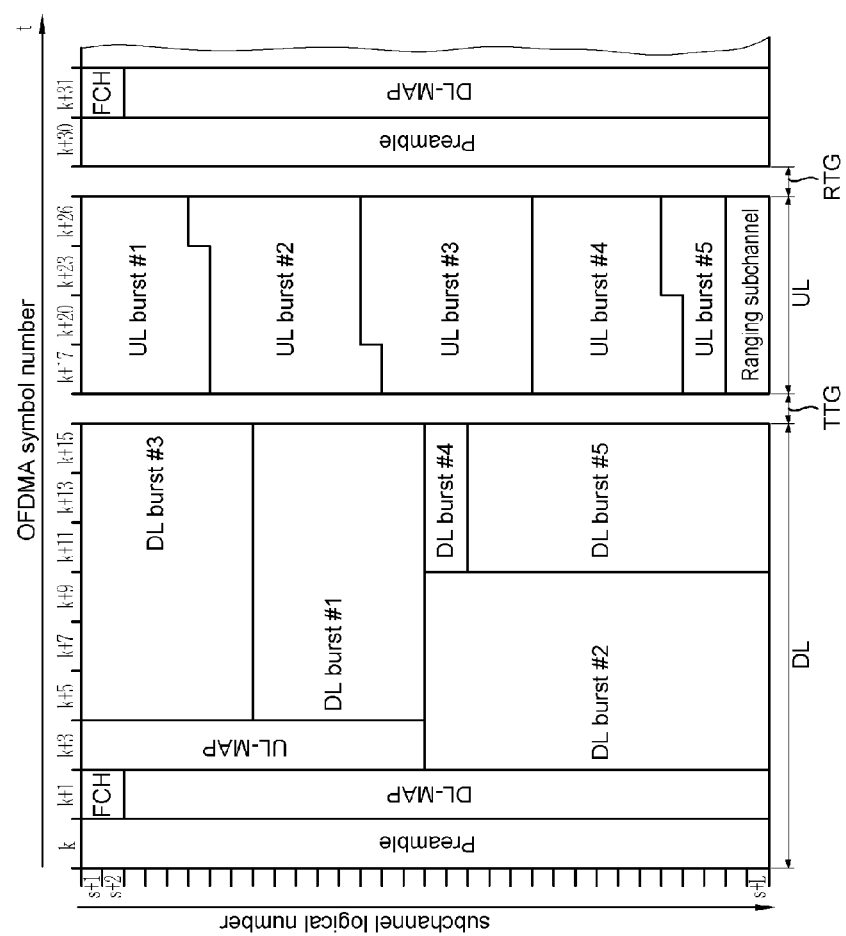
FIG. 2 shows an example of a frame structure.

FIG. 2 shows an example of a frame structure. A frame is a data sequence used according to a physical specification in a fixed time duration.

Referring to FIG. 2, the frame includes a downlink (DL) frame and an uplink (UL) frame. When a time division duplex (TDD) scheme is used, UL and DL transmissions share the same frequency but are performed in different time periods. The DL frame is temporally prior to the UL frame. The DL frame includes a preamble, a frame control header (FCH), a DL-MAP, a UL-MAP, and a DL burst region, in that order. Guard times are provided to distinguish the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, frequency offset estimation, and channel estimation. An FCH includes information regarding a length of a DL-MAP message and a coding scheme of the DL-MAP.

The DL-MAP is a region where the DL-MAP message is transmitted. The DL-MAP message defines a connection of a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message.

The UL-MAP is a region where a UL-MAP message is transmitted. The UL-MAP message defines a connection of a UL channel. The UL-MAP message includes a configuration change count of an uplink channel descriptor (UCD) and also includes an effective start time of UL assignment defined by the UL-MAP. The UCD describes a UL burst profile. The UL burst profile indicates characteristics of a UL physical channel and is periodically transmitted by the BS by using a UCD message. The UCD message includes information on a back-off window for ranging.

Figure 3:
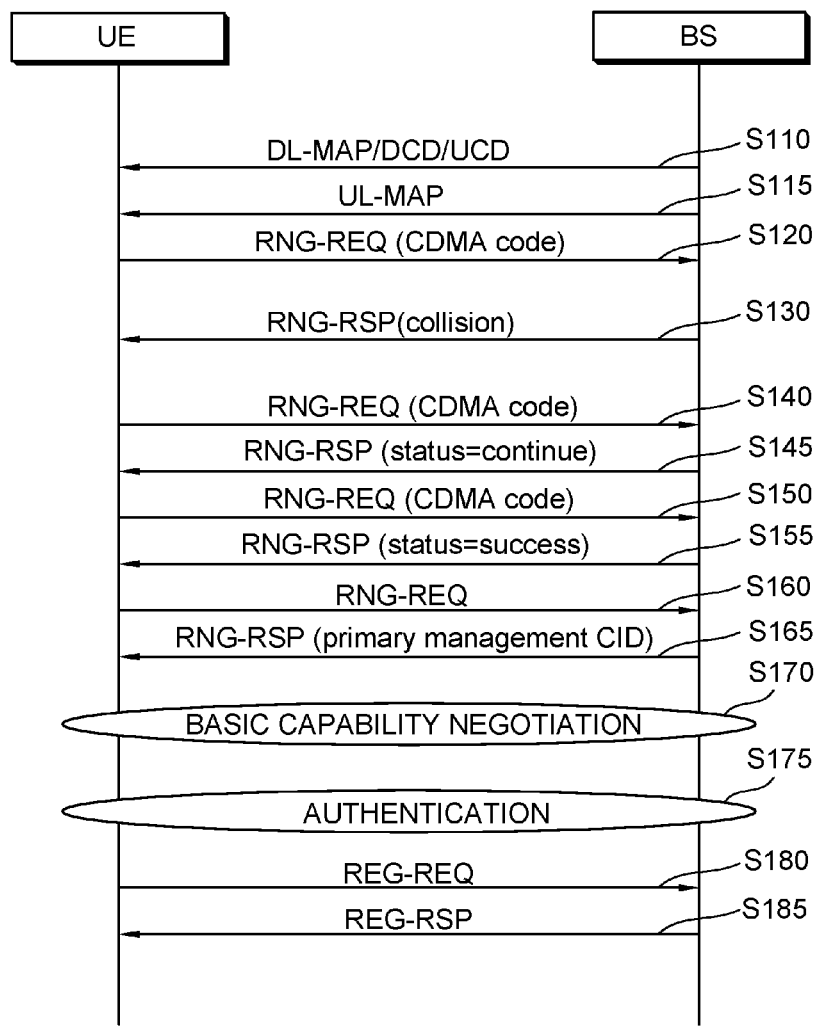
FIG. 3 is a flow diagram showing a network initialization procedure according to an embodiment of the present invention.

FIG. 3 is a flow diagram showing a network initialization procedure according to an embodiment of the present invention. Network initialization is a process in which a UE initially enters a network. Initial ranging is a process in which an exact timing offset is obtained between the UE and a BS and transmit (Tx) power is regulated in an initial stage.

Referring to FIG. 3, the UE reads a DL-MAP message transmitted from the BS (step S110). The UE has to obtain a DL channel for the purpose of initialization. The UE may obtain the DL channel when a signal is lost. The UE obtains a frame structure by scanning a radio channel and is synchronized with the BS. The UE can attain medium access control (MAC) synchronization by receiving at least one DL-MAP message. Upon attaining the MAC synchronization, the UE can continuously receive the DL-MAP message, a DCD message, and a UCD message. After synchronization, the UE waits for receiving the UCD message from the BS and thus obtains Tx parameters related to an available uplink channel. The UCD message includes a time and frequency at which a ranging request is transmitted. The UCD message can specify one or more groups consisting of 6 (or 8) contiguous subchannels in which contention-based ranging is performed. The term 'contention-based' means that transmission can be made by at least one UE at the same time through the same subchannel.

To find an initial ranging interval, the UE reads a UL-MAP message (step S115). The BS allocates the initial ranging interval consisting of at least one transmission opportunity. The transmission opportunity means allocation is provided by the UL-MAP or the like so that UEs belonging to a specific authorized group can transmit an initial ranging request.

The UE transmits a ranging request (RNG-REQ) message (step S120). The RNG-REQ message is transmitted from the UE in the initialization process in order to determine a network delay and to request changes of power and/or DL burst profiles. The UE randomly selects a ranging slot within a backoff window included in a UCD and transmits a ranging code. The ranging code is a code division multiple access (CDMA) code randomly selected from a series of permitted codes. The ranging code may be a pseudo-random bit sequence (PRBS) binary phase shift keying (BPSK) code. Steps S130 to S185 will be explained below when a ranging slot structure is described.

Figure 4:
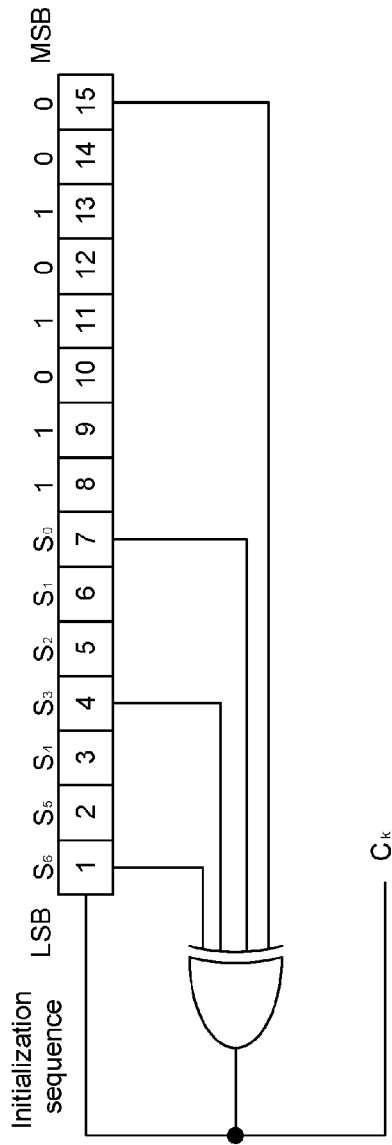
FIG. 4 shows an example of a pseudo-random bit sequence (PRBS) generator.

FIG. 4 shows an example of a PRBS generator.

Referring to FIG. 4, a polynomial generator for generating a polynomial $1+X^1+X^4+X_7+X^{15}$ is implemented, wherein a sequence code of an output $C_k$ is a ranging code. The PRBS generator generates 256 orthogonal codes having a length of 144 bits. According to purposes, the orthogonal codes may be used for initial ranging, handover ranging, periodic ranging, and bandwidth request. A UE randomly selects one code from a code set suitable for its ranging purpose among the 256 orthogonal codes.

A 144-bit ranging code is modulated by a subcarrier belonging to a group consisting of 6 (or 8) subchannels. A plurality of subchannels in which the ranging code is modulated is referred to as a ranging subchannel.

Figure 5:
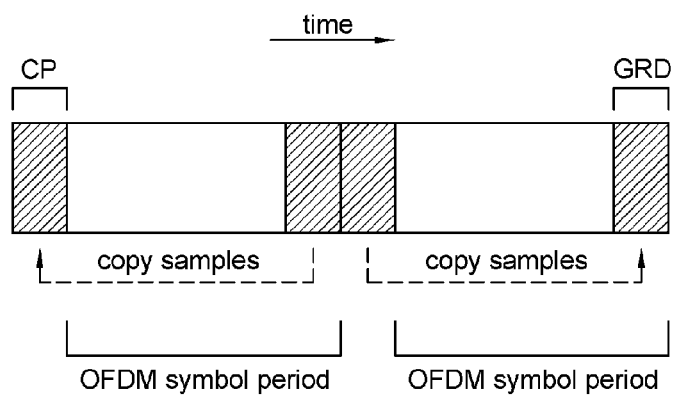
FIG. 5 shows a structure of an orthogonal frequency division multiplexing (OFDM) symbol used in a ranging code for initial ranging and handover ranging.

FIG. 5 shows a structure of an OFDM symbol used in a ranging code for initial ranging and handover ranging. Initial ranging transmission and handover ranging transmission are performed during a period of two consecutive OFDM symbols. The same ranging code is transmitted on a ranging subchannel during a period of each OFDM symbol. Such a structure can be repeated to transmit the ranging code during a period of 4 OFDM symbols.

Figure 6:
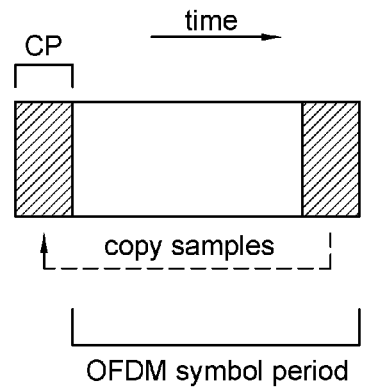
FIG. 6 shows a structure of an OFDM symbol used in a ranging code for periodic ranging and bandwidth request.

FIG. 6 shows a structure of an OFDM symbol used in a ranging code for periodic ranging and bandwidth request. During a period of one OFDM symbol, the ranging code is transmitted on a ranging subchannel. Such a structure can be repeated 3 times to transmit the ranging code during a period of 3 OFDM symbols.

Figure 7:
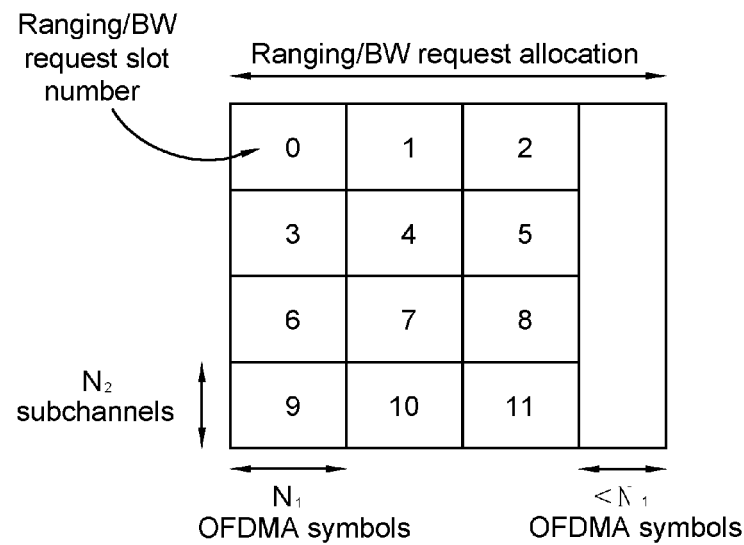
FIG. 7 shows a structure of a ranging slot.

FIG. 7 shows a structure of a ranging slot.

Referring to FIG. 7, the ranging slot includes $N_1$ OFDM symbols and $N_2$ subchannels. The ranging slot is also referred to as a ranging opportunity size. $N_1$ denotes the number of OFDM symbols required to transmit the ranging code. $N_2$ denotes the number of subchannels required to transmit the ranging code.

A UE randomly selects a ranging code and a ranging slot. Since one cell includes a plurality of UEs, two or more UEs may simultaneously attempt ranging by using the same ranging code and the same ranging slot. A ranging request message is a message transmitted through the ranging slot. UEs that transmit the ranging request message at the same time through the same ranging slot are in a contention state. In the ranging procedure, collision occurs when two or more UEs simultaneously select the same ranging code and transmit the ranging code to a BS through the same ranging slot. The BS can detect the collision by sensing multi-peaks with respect to the same ranging code through the same ranging slot.

Referring back to FIG. 3, ⊔ BS transmits a ranging response (RNG-RSP) message including collision information when UEs are in the contention state (step S130). When collision occurs, the BS transmits the RNG-RSP message including collision information so as to report the occurrence of collision to the UEs.

If no response message is delivered from the BS to the UE when collision occurs, the UE can retransmit a RNG-REQ message after waiting for a predetermined waiting time. The waiting time may be in the range of 50 ms to 200 ms according to the purpose of ranging. The waiting time may result in performance degradation of the entire system since the ranging procedure may be delayed in a UE in which synchronization is not achieved due to abrupt changes in a channel or in a UE in which handover is being currently performed. When no response message is received in response to the RNG-REQ message, the UE attempts re-ranging. In general, when re-ranging is attempted, a Tx power level is increased to be greater than that of the previous RNG-REQ message so that reception probability is increased in the BS. If the reason of not receiving the response message is collision of the RNG-REQ message, the Tx power level of the RNG-REQ message does not need to be increased when the re-ranging is attempted.

Upon detecting collision, if the BS informs the UE of the occurrence of collision, ranging can be immediately resumed, thereby avoiding unnecessary delay. In addition, since there is no need to increase the paver level of the RNG-REQ message transmitted when re-ranging is attempted, a battery lifespan of the UE can be increased.

When the UE recognizes the occurrence of collision through the report from the BS, the UE transmits a RNG-REQ message including a new ranging code through a new ranging slot (step S140).

The BS transmits a RNG-RSP message to indicate that the ranging code is successfully received (step S145). Upon receiving the ranging code, the BS transmits an index of the received ranging code and a ranging slot number together with time/frequency offset information by carrying them on the RNG-RSP message. The BS does not know which UE transmits the ranging code. Thus, the BS specifies a CDMA code and a ranging slot so that the UE can be identified through the ranging slot.

The RNG-RSP message is a broadcast message. Through ranging, the BS determines a symbol timing offset and a Doppler shift which depend on transmission delay or determines a frequency offset, receive (Rx) power, etc., which depend on an inaccurate oscillator. By using the determined information, the BS transmits correction information to the UE. The UE repeats the ranging procedure until power, timing, and frequency are arranged.

The RNG-RSP message includes ranging status information. If the ranging status is 'continue', although transmission attempt is not successful, the UE performs correction specified by the RNG-RSP message, and registers another CDMA code after a backoff delay is appropriately achieved.

If the ranging status of the received RNG-RSP message is 'continue', the UE repeatedly transmits the CDMA code through the RNG-REQ message (step S150). The UE updates the timing and power specified in the RNG-RSP message and transmits the RNG-REQ message. Through the RNG-RSP message, the UE confirms that the BS receives the ranging code transmitted by the UE. According to information carried on the RNG-RSP message, the UE regulates the Tx power and adjusts time/frequency synchronization.

The BS transmits a RNG-RSP message whose ranging status is 'success' (step S155). The BS continues to perform additional delicate tuning through the RNG-RSP message. The RNG-REQ/RSP steps are repeated until the BS transmits a RNG-RSP message including 'ranging success' or 'ranging abort'.

After receiving the RNG-RSP message whose ranging status is 'success', the UE transmits a RNG-REQ message including its unique identifier (step S160). Since the ranging procedure is based on contention, an identifier for identifying each UE is required when the ranging is successful. The unique identifier may be a MAC address. The MAC address is assigned in a manufacturing process and is used as a unique identifier for identifying each UE.

The BS transmits a RNG-RSP message including a primary management connection identifier (CID) (step S165). The CID is a value for identifying a MAC connection between the BS and the UE. A first management CID is established during the initial ranging and is used to transmit a delay-tolerant MAC message.

The BS and the UE negotiate basic capability (step S170). Immediately after completing the ranging, the UE transmits an SS basic capability request (SBC-REQ) message including its basic capability. The provided basic capability is related to whether automatic repeat request (ARQ) is supported, whether MAC-level cyclic redundancy check (CRC) is supported, etc. In response to the SBC-REQ message, the BS transmits an SS basic capability response (SBC-RSP) message.

The UE and the BS authenticate each other and exchange authorization keys (step S175).

The UE transmits a registration request (REG-REQ) message (step S180). The REG-REQ message includes the primary management CID.

In response to the REG-REQ message, the BS transmits a registration response (REG-RSP) message (step S185). The REG-RSP message includes a secondary management CID. The secondary management CID is a CID for a connection which is established during a process of registering the UE and is used to transmit a standard-based message such as a simple network management protocol (SNMP) or a dynamic host configuration protocol (DHCP).

After registration is achieved, Internet protocol (IP) connectivity is established, a time of day is set, and other operation parameters are transmitted. Accordingly, connection setup is completed.

Figure 8:
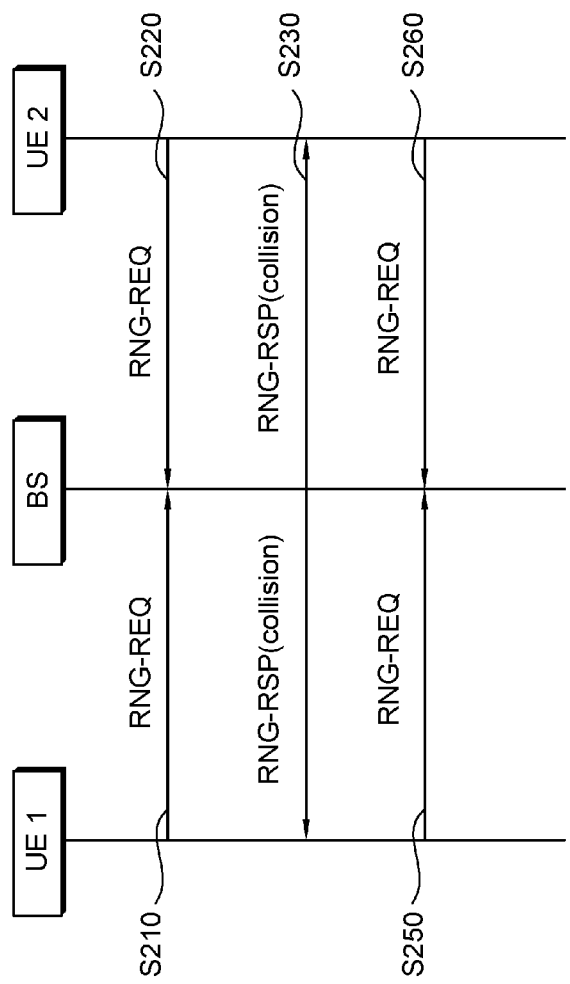
FIG. 8 is a flow diagram showing collision occurring in a ranging procedure.

FIG. 8 is a flow diagram showing collision occurring in a ranging procedure.

Referring to FIG. 8, a first UE (hereinafter, UE1) and a second UE (hereinafter, UE2) simultaneously attempt ranging on a BS. The UE1 transmits a RNG-REQ message to the BS (step S210). The UE2 also transmits a RNG-REQ message to the BS (step S220). The UE1 and the UE2 transmit the same ranging code through the same ranging slot.

Upon detecting collision of the RNG-REQ message by using multi-peaks, the BS transmits a RNG-RSP message for reporting the occurrence of collision (step S230). The RNG-RSP message includes the collided ranging code and collision information. The RNG-RSP message is a broadcast message.

Upon detection collision, the UE1 retransmits the RNG-REQ message (step S250). Upon detection collision, the UE2 also retransmits the RNG-REQ message (step S260). The UE1 and the UE2 recognize that collision occurs in the RNG-REQ messages transmitted by themselves, and thus immediately transmit the RNG-REQ messages in a next ranging region without waiting for an extra waiting time.

When collision occurs, the BS can inform the UEs of the occurrence of collision so that a ranging delay caused by the collision can be reduced.

Now, a method for reporting occurrence of collision by using a RNG-RSP message will be described.

According to an embodiment, a collision status indicating whether collision occurs is appended to a ranging status field indicating a ranging status and included in the RNG-RSP message. This is shown in Table 1 below.

TABLE 1

| Syntax | Notes |
| --- | --- |
| Ranging Status | Used to indicate whether RNG-REQ messages are received. 1 = continue, 2 = abort, 3 = success, 4 = fast re-ranging |

In Table 1, 'continue' denotes that a RNG-REQ message is successfully received but delicate tuning is continued, 'abort' denotes that the ranging procedure is aborted, 'success' denotes that the ranging procedure is successful, and 'fast re-ranging' denotes that the ranging procedure is resumed due to collision.

According to another embodiment, the RNG-RSP message may include a collision indicator field indicating whether collision occurs in the RNG-RSP message. This is shown in Table 2 belay.

TABLE 2

| Syntax | Notes |
| --- | --- |
| Collision Indicator | Used to indicate the collision of RNG-REQ messages from multiple UEs. 0 = no collision, 1 = collision |

The occurrence of collision can be immediately known through the collision indicator.

The aforementioned embodiments are for exemplary purposes only, and thus collision information can be included in the RNG-RSP message in various manners. Thus, the ranging status can be used in combination with the collision indicator.

Figure 9:
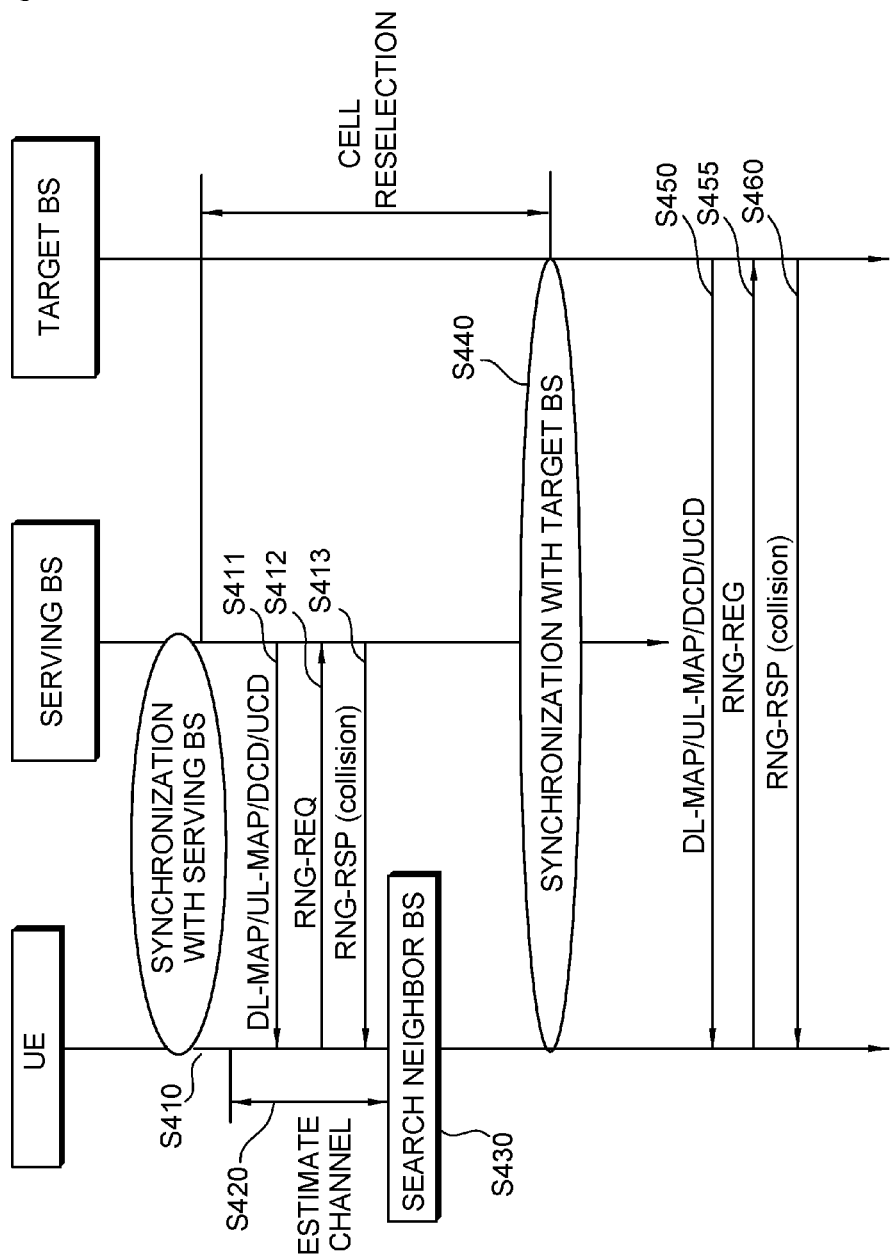
FIG. 9 is a flow diagram showing a handover procedure according to an embodiment of the present invention.

FIG. 9 is a flow diagram showing a handover procedure according to an embodiment of the present invention. A handover, as also as known as a handoff, is a process of moving from a radio interface provided by a BS to another radio interface provided by another BS. A serving BS denotes a BS to which a UE is the most recently registered. A target BS denotes a BS to which a UE will be registered as a result of handover. A neighbor BS denotes a BS which is not the serving BS.

Referring to FIG. 9, a UE attains synchronization with the serving BS (step S410). The UE receives from the serving BS a DL-MAP message, a UL-MAP message, a DCD message, and a UCD message and thus attains DL parameters and UL parameters (step S411). The UE starts initial ranging by transmitting a RNG-REQ message to the serving BS (step S412).

When the same ranging code is transmitted through the same ranging slot from at least two UEs, the serving BS transmits a RNG-RSP message to inform whether collision occurs (step S413). The UE can transmit a new RNG-REQ message immediately after checking the occurrence of collision.

The UE continuously measures a channel after synchronization with the serving BS is attained (step S420). The MS searches neighbor BSs (step S430). To find an available neighbor BS, the UE can use information obtained from a neighbor advertisement (NBR-ADV) message. Cell reselection is a process in which the UE searches the neighbor BSs and associates the neighbor BSs in order to determine their suitability in consideration of performance as a handover target.

The handover procedure starts when the UE determines a handover from the serving BS to the target BS. The handover determination can be originated by the UE, the serving BS, or a network. When the serving BS desires to initiate the handover, the serving BS can transmit a BS handover request (BSHO-REQ) message. When the MS desires to initiate the handover, the UE can transmit a MS handover request (MSHO-REQ) message. The serving BS may transmit a BS handover response (BSHO-RSP) message in response to the MSHO-REQ message. When the MSHO-REQ message is transmitted by the UE, the UE can indicate one or more available target BSs. When the BSHO-REQ message is transmitted by the serving BS, the serving BS can indicate one or more available target BSs.

While the handover is performed, the UE transmits a handover indication (HO-IND) message as a finical indicator. According to the HO-IND message, the serving BS can terminate a service with the UE. When the UE cancels or rejects the handover, the UE transmits the HO-IND message together with suitable fields.

The UE is synchronized with the target BS (step S440). The UE receives from the target BS a DL-MAP message, a UL-MAP message, a DCD message, and a UCD message and obtains DL parameters and UL parameters (step S450).

The UE transmits a RNG-REQ message to the target BS and thus starts initial ranging (step S455). When the same ranging code is transmitted through the same ranging slot from at least two UEs, the target BS transmits a RNG-RSP message to inform whether collision occurs (step S460). The MS can transmit a new RNG-REQ message immediately after checking the occurrence of collision.

Figure 10:
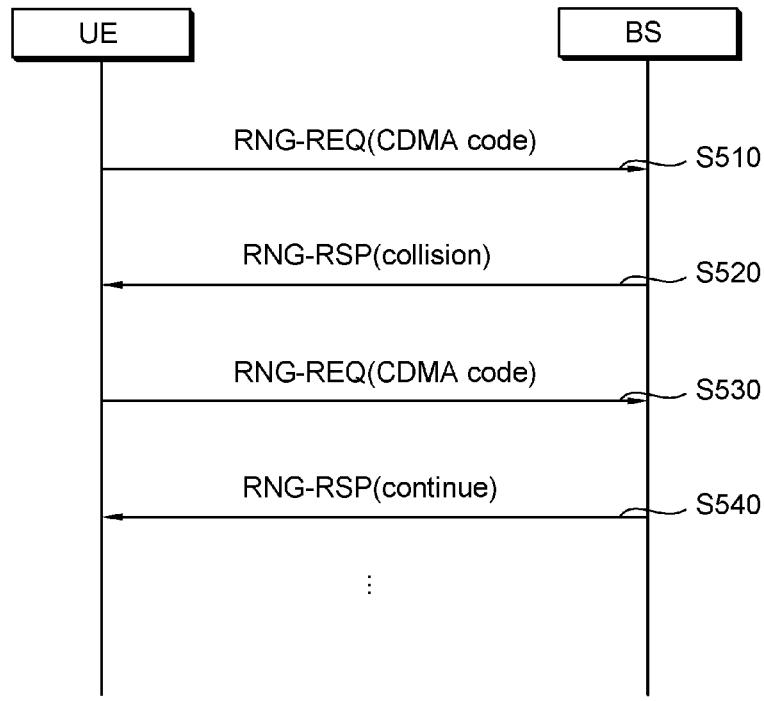
FIG. 10 is a flow diagram showing a periodic ranging procedure according to an embodiment of the present invention.

FIG. 10 is a flow diagram showing a periodic ranging procedure according to an embodiment of the present invention. The periodic ranging is a process in which a UL timing offset and received signal strength are periodically tracked after initial ranging.

Referring to FIG. 10, a UE transmits a RNG-REQ message (step S510). The UE randomly selects a ranging code (e.g., a CDMA code) and a ranging slot, and transmits them to a BS.

The BS transmits a RNG-RSP message including collision information when UEs contend with one other (step S520). When at least two UEs simultaneously transmit the same ranging code through the same ranging slot, collision occurs. The BS transmits a RNG-RSP message including collision information so that the UE can immediately know the occurrence of collision.

Upon checking the collision information from the BS, the UE transmits a RNG-REQ message including a new ranging code through a new ranging slot (step S530).

The BS transmits a RNG-RSP message to indicate that the ranging code is successfully received (step S540). Upon receiving the ranging code, the BS transmits the received ranging code through the RNG-RSP message. If a ranging status is 'continue', the UE randomly selects the ranging code and continuously performs the ranging procedure.

Figure 11:
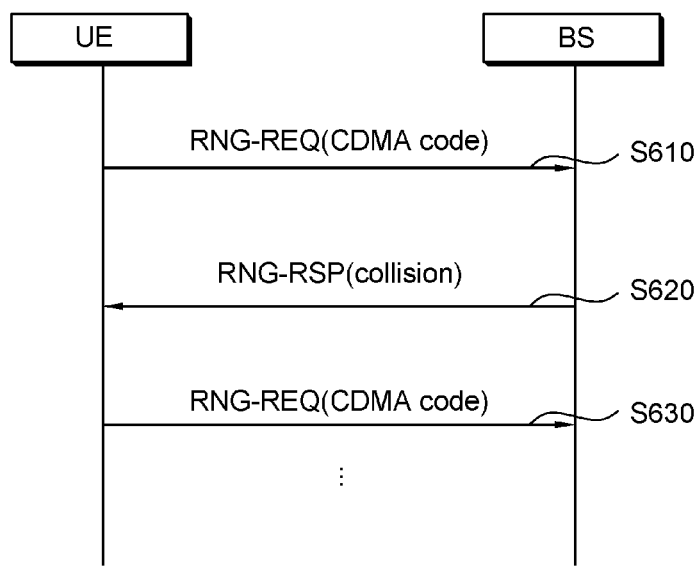
FIG. 11 is a flow diagram showing a ranging procedure according to an embodiment of the present invention.

FIG. 11 is a flow diagram showing a ranging procedure according to an embodiment of the present invention.

Referring to FIG. 11, a UE transmits a RNG-REQ message (step S610). The UE randomly selects a ranging code (e.g., a CDMA code) and a ranging slot, and transmits them to a BS.

When collision occurs, the BS transmits a RNG-RSP message whose ranging status is 'continue' (step S620). Even if collision occurs without adding separate signaling to a ranging status field, the BS transmits the RNG-RSP message while the ranging status remains in 'continue'.

When collision occurs in the ranging procedure, the BS checks a multi-peak with respect to the same CDMA code on the same ranging slot. Collided UEs can adjust time/frequency and paver according to a specific reference peak, thereby preventing the ranging procedure from being delayed. In this case, an average value obtained by averaging offsets of all peaks may be transmitted. In addition, any one of the multi-peaks may be selected and offset information of the selected peak may be transmitted. In addition, a metric for time/frequency/power is determined and offset information with respect to a peak having a greatest offset of the metric may be transmitted.

Collision occurs when at least two UEs simultaneously transmit the same ranging code through the same ranging slot. The BS transmits a RNG-RSP message even if collision occurs, thereby minimizing a delay in the ranging procedure.

The UE regulates Tx paver according to the offset information included in the RNG-RSP message, adjusts time/frequency synchronization, and transmits a RNG-REQ message including a new ranging code through a new ranging slot (step S630).

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for performing a ranging procedure for attaining uplink synchronization, the method comprising:
transmitting a ranging request message through a randomly selected ranging slot to a base station, the ranging request message comprising a randomly selected ranging code; and
receiving a ranging response message from the base station, the ranging response message including
collision information which informs that a collision between ranging codes occurs when at least two user equipments transmit the same ranging code to the base station through the same ranging slot, and
offset information which indicates an offset with respect to a specific reference peak among the colliding ranging codes,
wherein the collision information is a collision indicator field which has a size limited to 1 bit.

2. The method of claim 1, wherein the collision information is one of ranging statuses included in the ranging response message.

3. The method of claim 1, further comprising:
transmitting a ranging request message through a new ranging slot which is randomly selected after the ranging response message is received.

4. A method for performing a ranging procedure in which a base station regulates a time or frequency offset required for uplink transmission, the method comprising:
receiving a ranging request message by which a ranging code randomly selected by each user equipment is transmitted through a randomly selected ranging slot; and
transmitting a ranging response message to the each user equipment, the ranging request message including
collision information which informs that a collision between ranging codes occurs when the plurality of user equipments transmits the ranging request message including the same ranging code through the same ranging slot, and
offset information which indicates an offset according to a specific reference peak among the colliding ranging codes,
wherein the collision information is a collision indicator field which has a size limited to 1 bit.

5. The method of claim 4, wherein the ranging response message comprises a ranging code which may collide with another ranging code.

6. The method of claim 4, wherein the randomly selected ranging slot comprises a plurality of orthogonal frequency division multiplexing (OFDM) symbols and a plurality of subchannels.

7. The method of claim 1, wherein the offset information is an average value obtained by averaging an offset of all peaks of the colliding ranging codes.

8. The method of claim 1, wherein the offset information is an offset with respect to a peak of the randomly selected ranging code among the colliding ranging codes.

9. The method of claim 1, wherein the offset with respect to the specific reference peak is one of a greatest time offset, a greatest frequency offset, and a greatest power offset.

10. The method of claim 1, wherein the randomly selected ranging slot comprises a plurality of orthogonal frequency division multiplexing (OFDM) symbols and a plurality of subchannels.

11. The method of claim 1, wherein the specific reference peak is one of multiple peaks of the randomly selected ranging code in the randomly selected ranging slot.

12. The method of claim 4, wherein the specific reference peak is one of multiple peaks of the randomly selected ranging code in the randomly selected ranging slot.

* * * * *